US011638181B2

(12) United States Patent
Nandyal

(10) Patent No.: US 11,638,181 B2
(45) Date of Patent: Apr. 25, 2023

(54) METHOD TO RETRIEVE SECURITY KEYS OF UE IN GATEWAYS

(71) Applicant: Parallel Wireless, Inc., Nashua, NH (US)

(72) Inventor: Arjun Nandyal, Bengaluru (IN)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 17/486,907

(22) Filed: Sep. 27, 2021

(65) Prior Publication Data

US 2022/0104080 A1 Mar. 31, 2022

Related U.S. Application Data

(60) Provisional application No. 63/083,263, filed on Sep. 25, 2020.

(51) Int. Cl.
*H04W 36/00* (2009.01)
*H04W 12/0431* (2021.01)
*H04L 5/00* (2006.01)

(52) U.S. Cl.
CPC ... *H04W 36/0038* (2013.01); *H04W 12/0431* (2021.01); *H04W 36/0016* (2013.01); *H04L 5/0055* (2013.01)

(58) Field of Classification Search
CPC ......... H04W 36/0038; H04W 12/0431; H04W 36/0016; H04W 12/04; H04L 5/0055
See application file for complete search history.

(56) References Cited

U.S. PATENT DOCUMENTS

| 2011/0223919 A1* | 9/2011 | Vikberg | H04W 36/08 455/436 |
| 2011/0269465 A1* | 11/2011 | Xu | H04W 36/0033 455/436 |
| 2011/0286429 A1* | 11/2011 | Vikberg | H04W 36/0005 370/331 |
| 2013/0301610 A1* | 11/2013 | Ali | H04W 40/36 370/331 |

(Continued)

OTHER PUBLICATIONS

"A Comparative Introduction to 4G and 5G Authentication", Winter 2019, https://www.cablelabs.com/insights/a-comparative-introduction-to-4g-and-5g-authentication#fn-3.

(Continued)

*Primary Examiner* — Mazda Sabouri
(74) *Attorney, Agent, or Firm* — Michael Y. Saji; David W. Rouille

(57) ABSTRACT

Methods, systems, and computer readable media are presented for retrieving security keys in gateways. In one example embodiment, a method is presented. The method of retrieving security keys from a User Equipment (UE) in gateways includes retrieving, by a HetNet Gateway (HNG) as the HNG virtualizes an eNodeB towards n Mobility Management Entity (MME) through a first message and a second message exchange, a fresh Next Hop, Next Hop Chaining Count {NH, NCC} pair from the MME; and mocking, by the HNG, an X2 handover towards the MME by sending a third message with required Information Elements filled when a fourth message from the eNodeB reaches the HNG.

18 Claims, 6 Drawing Sheets

(56) References Cited

U.S. PATENT DOCUMENTS

| | | | |
|---|---|---|---|
| 2014/0192782 A1* | 7/2014 | Centonza | H04W 36/0011 370/331 |
| 2014/0308959 A1* | 10/2014 | De Benedittis | H04W 36/0061 455/437 |
| 2015/0172964 A1* | 6/2015 | Huang | H04W 76/30 455/437 |
| 2016/0105838 A1* | 4/2016 | Wang | H04W 40/04 370/329 |
| 2019/0268815 A1* | 8/2019 | Zhu | H04W 36/0066 |
| 2021/0084714 A1 | 3/2021 | Agarwal et al. | |

OTHER PUBLICATIONS

"Digital cellular telecommunications system (Phase 2+) (GSM)", Universal Mobile Telecommunications System (UMTS); LTE; 3GPP System Architecture Evolution (SAE); Security architecture, (3GPP TS 33.401 version 15.7.0 Release 15).

5G; Security architecture and procedures for 5G System, (3GPP TS 33.501 version 15.4.0 Release 15).

\* cited by examiner

METHOD TO RETRIEVE SECURITY KEYS OF UE IN GATEWAYS

CROSS-REFERENCE TO RELATED APPLICATIONS

This application claims priority under 35 U.S.C. § 119(e) to U.S. Provisional Pat. App. No. 63/083,263, filed Sep. 25, 2020, titled "A Method to Retrieve Security Keys of UE from MME in Gateways," which is hereby incorporated by reference in its entirety for all purposes. This application hereby incorporates by reference each of U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes US01, 71710US01, 71717US01, 71721US01, 71756US01, 71762US01, 71819US00, and 71820US01, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The LTE standard defines S1 interface between eNodeB and EPC, X2 interface between eNodeBs and RRC(UU) the air interface between UE and eNodeB. Further down, S1-C handles control plane messages between eNodeB and MME and S1-U handles the data plane(eGTP) between SGW and eNodeB. Similarly, X2-C handles control plane messages between eNodeBs and X2-U handles data plane (eGTP) between eNodeBs. Procedures for handling mobility within LTE involves RRC along with S1 or X2 interfaces. In a real-time scenario, LTE handsets are mobile and arise a need to re-establish RRC connection with base stations through standard procedures. While doing so, security keys at both handset and base station changes as per 3GPP TS 33.401, which is hereby incorporated by reference in its entirety for all purposes. Gateways serving as MME for multiple eNodeBs keep real EPC oblivious to these procedures. Most gateways retrieve security keys from EPC while failing to derive by themselves. S1 mobility procedure demands fresh key derivations to be provided to target eNodeB to eliminate possibility of handover failures using horizontally derived keys at UE and source eNodeB during RRC connection re-establishment procedure.

SUMMARY

A method to retrieve fresh security key context for User Equipment (UE) from Mobility Management Entity (MME) by Virtualized eNodeB (HNG) is defined. In field, UEs re-establishing air interface connection is quite common and it is associated with horizontal key derivation procedure. However, while S1 handovers within HNG vertical key derivations are necessary to eliminate any horizontally derived keys and sync keys at Non-Access Stratum (NAS) and Access Stratum (AS or RRC) level. HNG uses signaling from X2 handover procedure defined in 3GPP TS 36423 to retrieve keys and pass it to target eNodeB there by increasing the robustness of S1 handover procedures occurring among eNodeBs within the same HNG.

In one embodiment, a method of retrieving security keys from a User Equipment (UE) in gateways includes retrieving, by a HetNet Gateway (HNG) as the HNG virtualizes an eNodeB towards n Mobility Management Entity (MME) through a first message and a second message exchange, a fresh Next Hop, Next Hop Chaining Count {NH, NCC} pair from the MME; and mocking, by the HNG, an X2 handover towards the MME by sending a third message with required Information Elements filled when a fourth message from the eNodeB reaches the HNG.

In another embodiment, a system for retrieving security keys in gateways includes a HetNet Gateway (HNG); wherein the HNG retrieves, as the HNG virtualizes an eNodeB towards the MME through a first message and a second message exchange, a fresh {NH, NCC} from MME; and sends a third message with required Information Elements filled when a fourth message reaches the HNG.

In another embodiment a non-transitory computer-readable medium contains instructions for providing retrieving security keys from a User Equipment (UE) in gateways, which, when executed, cause a network node to perform steps including retrieving, by a HetNet Gateway (HNG) as the HNG virtualizes an eNodeB towards n Mobility Management Entity (MME) through a first message and a second message exchange, a fresh Next Hop, Next Hop Chaining Count {NH, NCC} pair from the MME; and mocking, by the HNG, an X2 handover towards the MME by sending a third message with required Information Elements filled when a fourth message from the eNodeB reaches the HNG.

DETAILED DESCRIPTION

Figure 1:
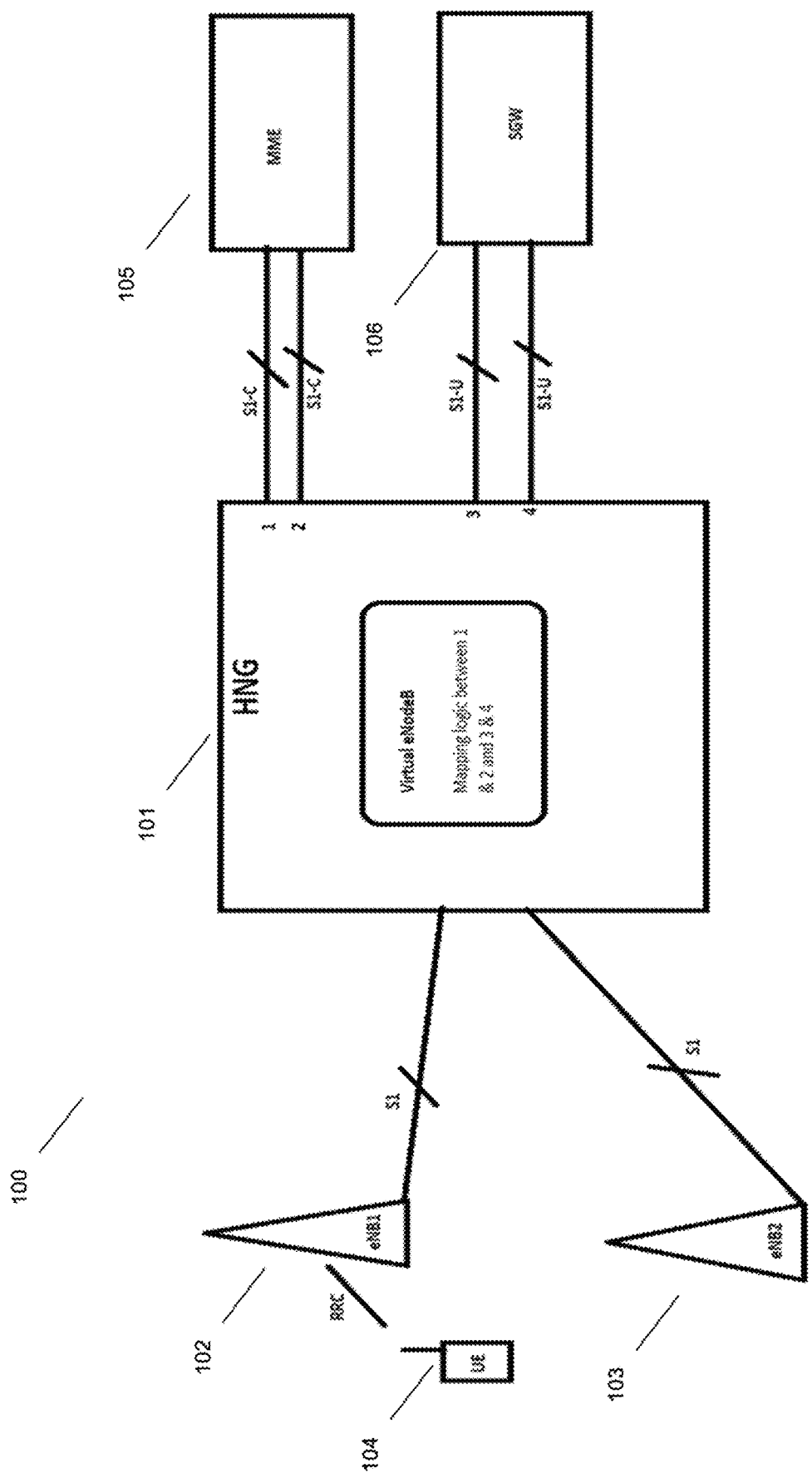
FIG. 1 is an architectural diagram, in accordance with some embodiments.

FIG. 1 shows an example environment 100 including an HNG 101, a first node eNB1 102 In communication with the HNG and with a User Equipment (UE) 104. Also shown is a second node eNB2 103 in communication with the HNG. The HNG is also in communication with an Mobility Management Entity (MME) 105 and a Serving Gateway (SGW) 106.

Figure 2:
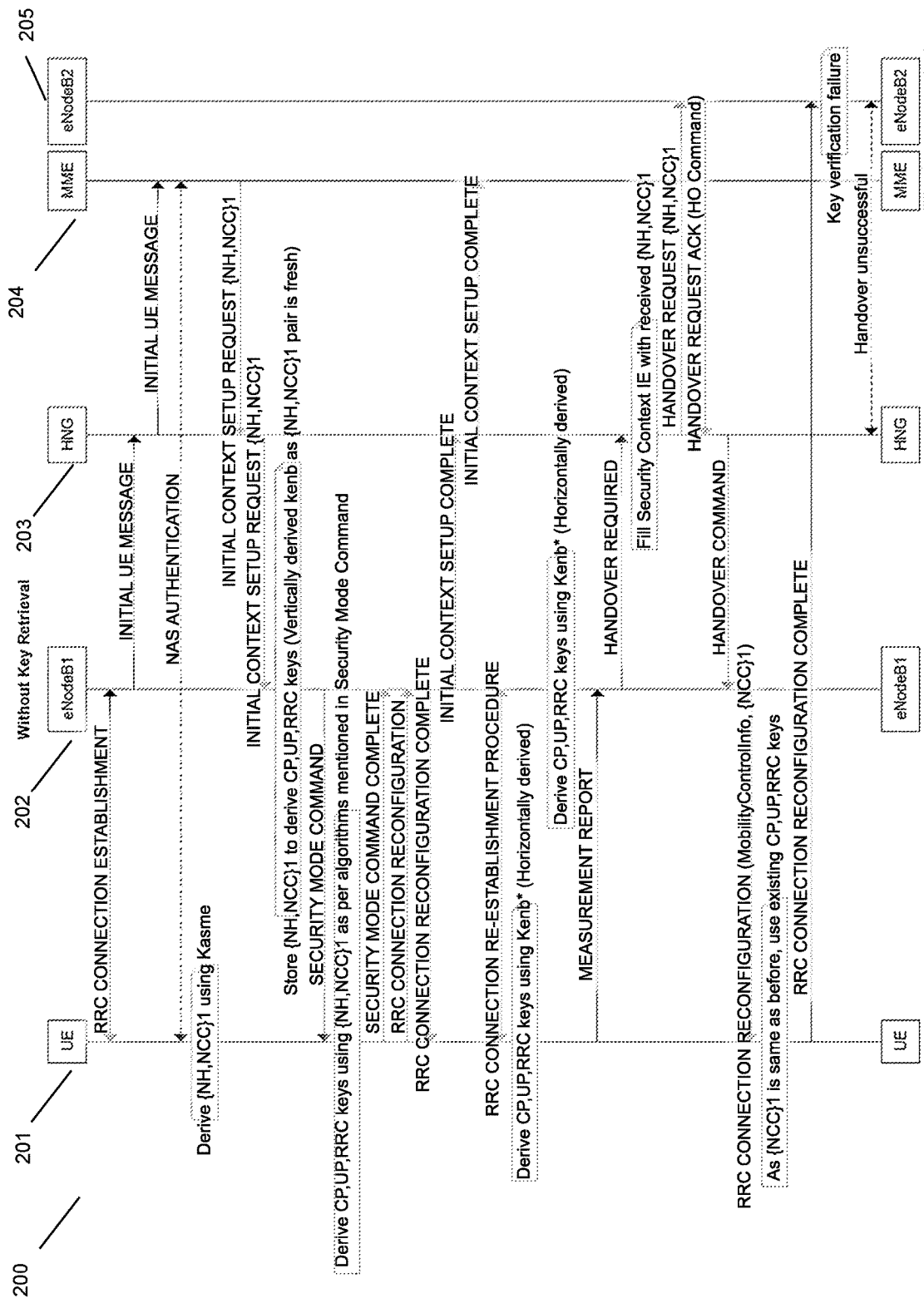
FIG. 2 is a call flow diagram without key retrieval, in accordance with some embodiments.

FIG. 2 shows a call flow without key retrieval 200, in some embodiments, within a system including a UE, a EnodeB1, an HNG, an MME and an eNodeB2. The HNG is a gateway node as described elsewhere herein and provides virtualization, proxying, and gatewaying between the RAN and the core.

When eNodeB1 and eNodeB2 are connected to same HNG and HNG is performing handovers in intra-HNG mode, if UE has performed RRC Connection Reestablishment prior to being handed out from serving eNodeB1, key derivations at target eNodeB2 will fail the incoming handover procedure there by degrading Key Performance Indicators (KPIs). Mobility KPIs are crucial factors influencing base station capabilities and user experiences.

A UE connected to eNodeB1 undergoes link re-establishment with the same eNodeB through 3GPP defined procedure known as RRC Connection Reestablishment. As a part of this procedure, UE and eNodeB are required to derive new set of security keys through horizontal key derivation procedures mentioned in 3GPP specifications.

Security keys comprise of a pair: Next hop parameter (NH) and Next hop chaining count (NCC). Noteworthy that at 203 the HNG fills the security context IE with received {NH, NCC} 1.

Figure 3:
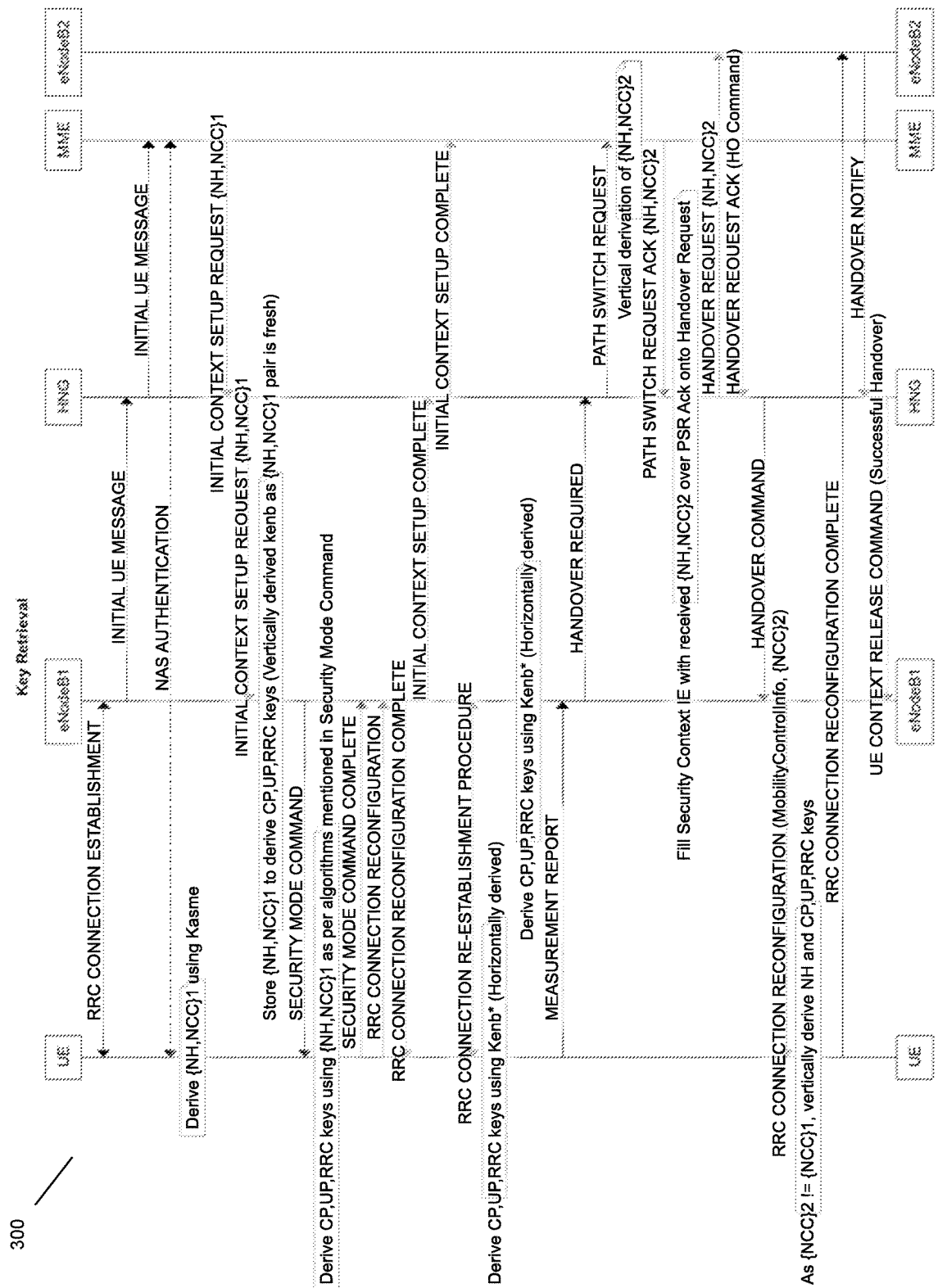
FIG. 3 is a call flow diagram with key retrieval, in accordance with some embodiments.

FIG. 3 shows key retrieval, in some embodiments. Subsequently, due to deteriorating radio conditions, this UE is decided to be handed out from eNodeB1 via S1 handover procedure to eNodeB2, connected to same HNG. As per 3GPP, a vertical key derivation of security keys shall be needed to perform. This includes deriving fresh NH and NCC parameters at HNG (acting as MME) and inform the NCC to UE via eNodeB2 to sync at NAS level. As HNG stores keys obtained through S1 procedures from MME (as HNG is just a relay), it populates the old keys issued for this UE during initial attach procedure and forwards to target eNodeB2. Point to note here is that as UE's keys and eNodeB2's keys are out of sync, UE's subsequent air interface (RRC) communication with target eNodeB2 will fail.

As shown by the call flow diagram 300 of FIG. 3, during S1 handovers a fresh {NH, NCC} pair are derived at MME. Since HNG keeps MME oblivious to S1 handovers for eNodeBs connected within HNG, retrieving fresh {NH, NCC} pair from MME is not possible via 3GPP defined S1 Handover procedures. However, by creating a message that appears to be a part of X2 handover procedure defined by 3GPP, HNG can force MME to derive a fresh {NH, NCC} pair. As HNG virtualizes eNodeB towards MME, through PATH SWITCH REQUEST and PATH SWITCH REQUEST ACK message exchanges. HNG can retrieve a fresh {NH, NCC} from MME. When HANDOVER REQUIRED message from eNodeB1 reaches HNG, HNG creates a mock X2 handover towards MME by sending PATH SWITCH REQUEST with required Information Elements filled. MME responds back with PATH SWITCH REQUEST ACK message comprising of fresh {NH, NCC} pair. Now, HNG sends HANDOVER REQUEST towards eNodeB2 with new keys used for vertical derivation. Subsequent handover message exchanges among eNodeB1, HNG and eNodeB2 continue unchanged.

In some embodiments, a Virtual eNodeB instance uses one additional interface each towards MME(S1-C) and SGW(S1-U) posing as a different eNodeB. Internal mapping of unique S1AP UE IDs along with EGTP Transport layer addresses for the bearers used for this UE and network interfaces of Virtual eNodeB instance shall be maintained at HNG during S1 handover (both control and data plane).

It is noted that 5G security builds on 4G security, and as a result the present methods would be able to be used with 5G, in some embodiments. In particular, 5G NSA uses an EPC core and is capable of the above messaging without modification, in some embodiments. In some embodiments, notably for 5G standalone (SA), the 5G equivalents of the 4G EPC messages described above are used, as described further in 3GPP, "Security Architecture and Procedures for 5G System" (Release 15), technical specification (TS) 33.501, which is hereby incorporated by reference in its entirety for all purposes. As well, in some embodiments an interworking function is used in a 4G/5G core to enable the use of either a 4G core with a 5G gNB, or a 5G core with a 4G eNB, as described in U.S. Pat. Pub. No. 20210084714A1, "4G/5G Core Interworking," which is also hereby incorporated by reference in its entirety for all purposes. When a 4G/5G core interworking function is used, the above methods could be used with either the 4G or 5G core as appropriate, using interworking at the HNG (e.g., a gateway node) to enable the messaging to function as described above.

Figure 4:
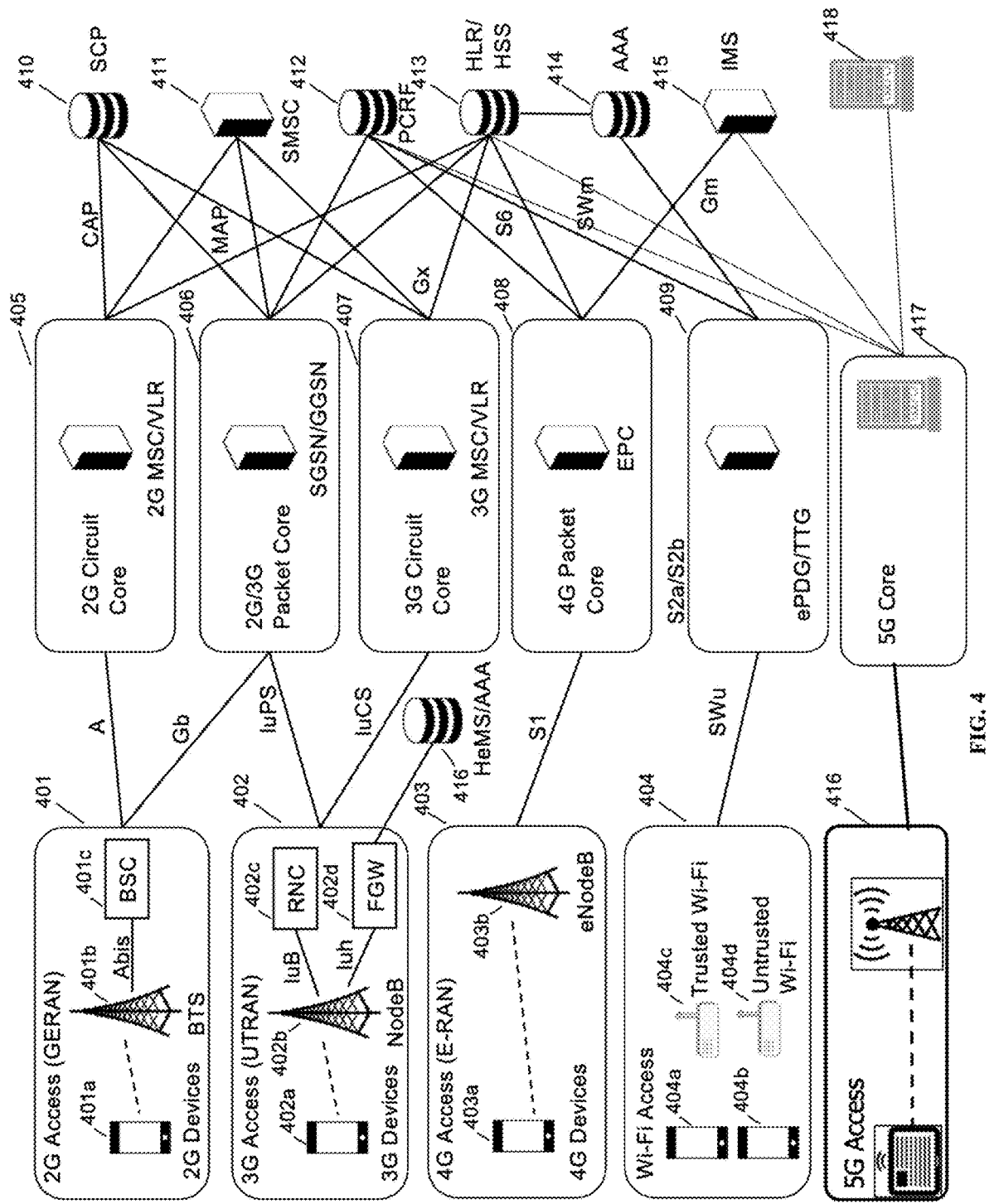
FIG. 4 is a schematic network architecture diagram for various radio access technology core networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non- "G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
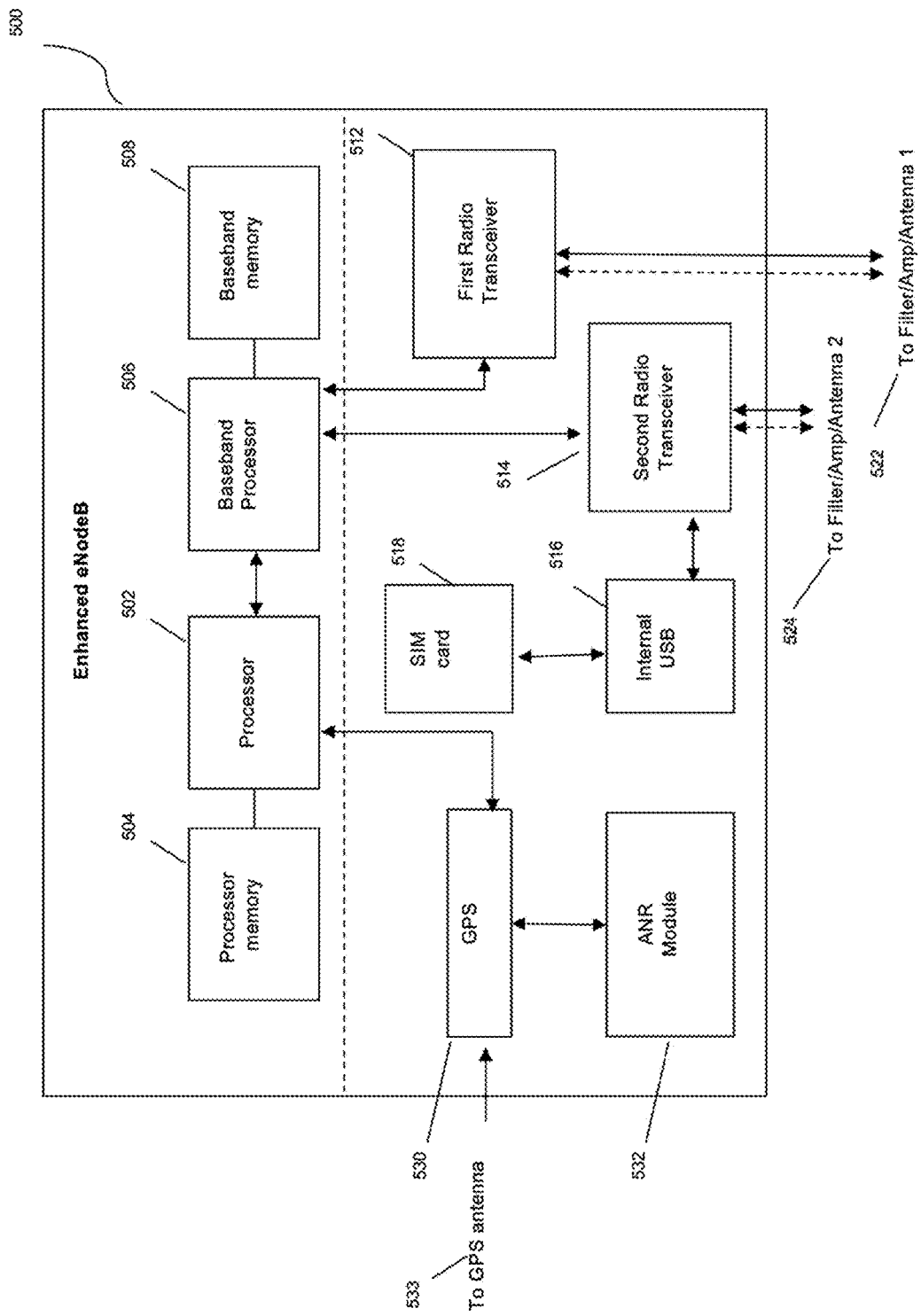
FIG. 5 is an enhanced eNodeB for performing the methods described herein, in accordance with some embodiments.

Shown in FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
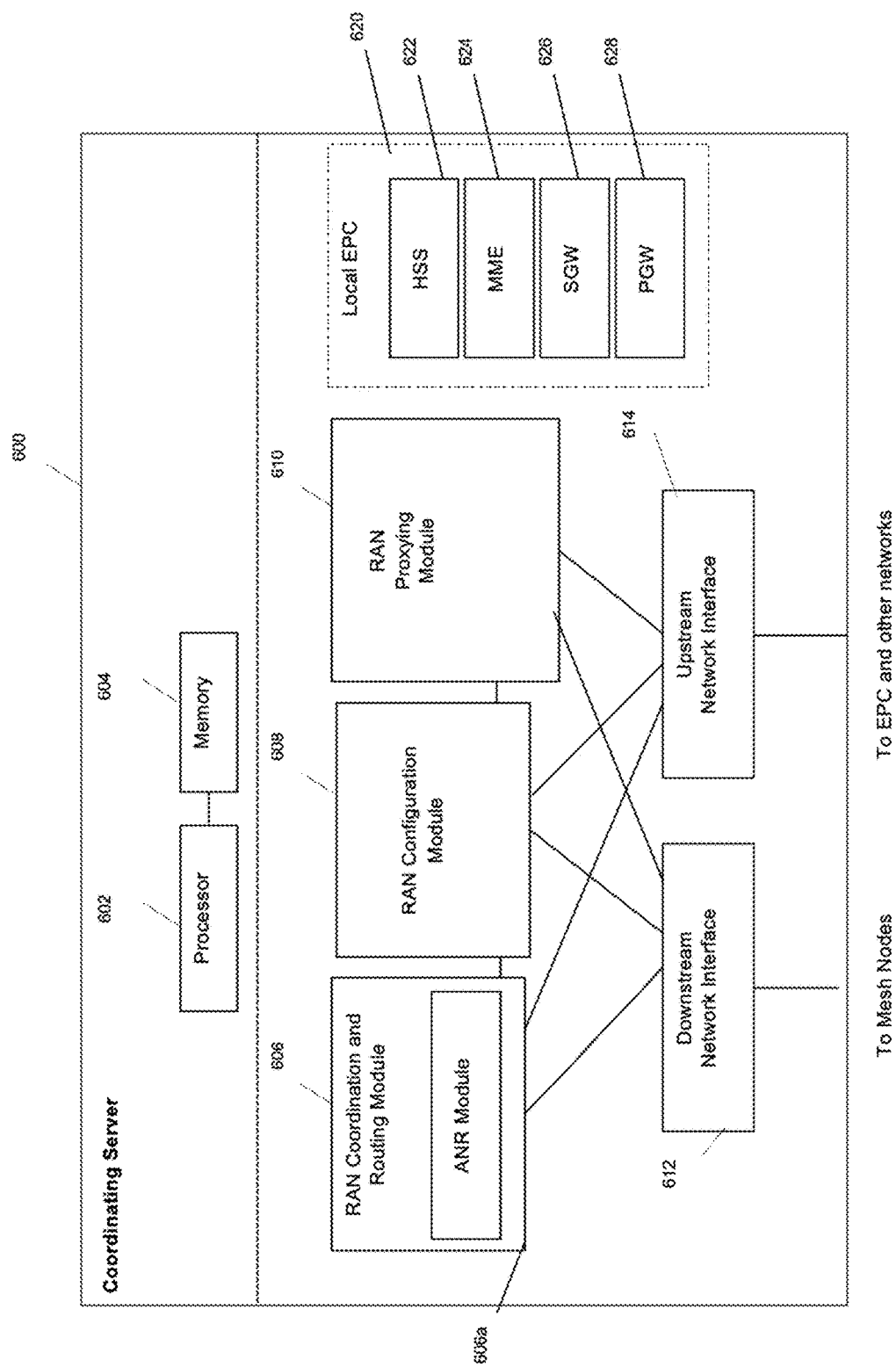
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of retrieving security keys from a User Equipment (UE) in gateways, comprising:
retrieving, by a HetNet Gateway (HNG) as the HNG virtualizes an eNodeB towards a Mobility Management Entity (MME) through a first message and a second message exchange, a fresh Next Hop, Next Hop Chaining Count {NH, NCC} pair from the MME; and
mocking, by the HNG, an X2 handover towards the MME by sending a third message with required Information Elements filled when a fourth message from the eNodeB reaches the HNG.

2. The method of claim 1 wherein the first message comprises a PATH SWITCH REQUEST.

3. The method of claim 1 wherein the second message comprises a PATH SWITCH REQUEST ACK.

4. The method of claim 3 wherein the third message comprises a HANDOVER REQEST.

5. The method of claim 1 wherein the fourth message comprises a HANDOVER REQUEST ACK message.

6. The method of claim 1 wherein the fresh {NH, NCC} are derived using vertical key derivation.

7. A system for retrieving security keys in gateways, comprising:
a HetNet Gateway (HNG), wherein the HNG retrieves, as the HNG virtualizes an eNodeB towards a Mobility Management Entity (MME) through a first message and a second message exchange, a fresh Next Hop, Next Hop Chaining Count {NH, NCC} pair from the MME; and
mocks an X2 handover towards the MME by sending a third message with required Information Elements filled when a fourth message from the eNodeB reaches the HNG.

8. The system of claim 7 wherein the first message comprises a PATH SWITCH REQUEST.

9. The system of claim 7 wherein the second message comprises a PATH SWITCH REQUEST ACK.

10. The system of claim 9 wherein the third message comprises a HANDOVER REQEST.

11. The system of claim 7 wherein the fourth message comprises a HANDOVER REQUEST ACK message.

12. The system of claim 7 wherein the fresh {NH, NCC} are derived using vertical key derivation.

13. A non-transitory computer-readable medium containing instructions for retrieving security keys from a User Equipment (UE) in gateways, which, when executed, cause a network node to perform steps comprising:
retrieving, by a HetNet Gateway (HNG) as the HNG virtualizes an eNodeB towards a Mobility Management Entity (MME) through a first message and a second message exchange, a fresh Next Hop, Next Hop Chaining Count {NH, NCC} pair from the MME; and
mocking, by the HNG, an X2 handover towards the MME by sending a third message with required Information Elements filled when a fourth message from the eNodeB reaches the HNG.

14. The computer-readable medium of claim 13 wherein the instructions for the first message comprise instructions for a PATH SWITCH REQUEST.

15. The computer-readable medium of claim 13 wherein the instructions for the second message comprise the instructions for a PATH SWITCH REQUEST ACK.

16. The computer-readable medium of claim 15 wherein the instructions for a third message comprise the instructions for a HANDOVER REQEST.

17. The computer-readable medium of claim 13 wherein the instructions for a fourth message comprises the instructions for a HANDOVER REQUEST ACK message.

18. The computer-readable medium of claim 13 further comprising instructions wherein the fresh {NH, NCC} are derived using vertical key derivation.

* * * * *